United States Patent Office 3,302,161
Patented Jan. 31, 1967

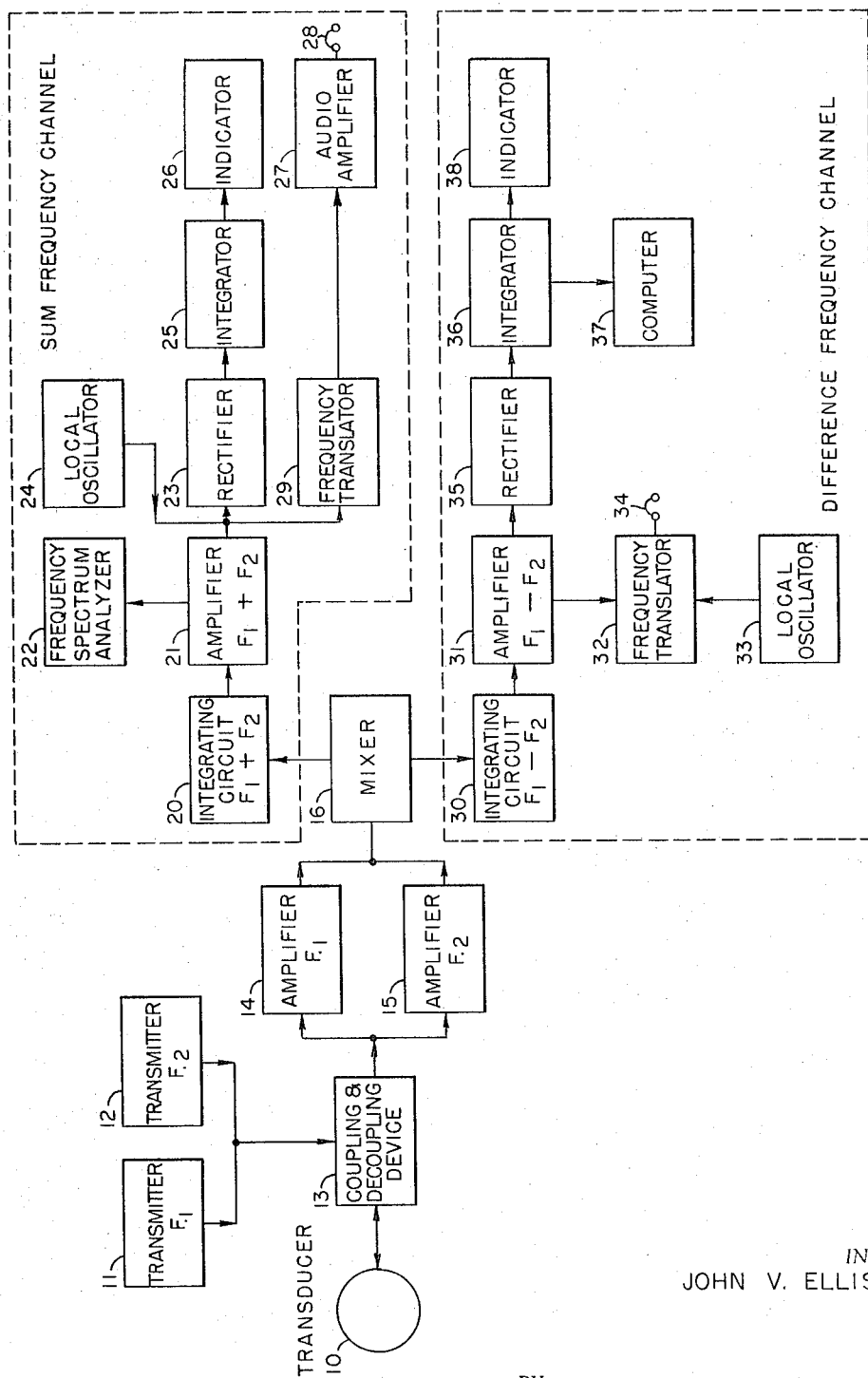

3,302,161
MULTIPLE-FREQUENCY RANGING SYSTEM
John V. Ellison, Washington, D.C., assignor to the United States of America as represented by the Secretary of the Navy
Filed Dec. 5, 1950, Ser. No. 199,271
8 Claims. (Cl. 340—3)

The invention described herein may be manufactured and used by or for the Government of the United States of America for governmental purposes without the payment of any royalties thereon or therefor.

This invention relates in general to a pulse echo signal locator system and in particular to the recognition and indication of direction of movement of a detected remote object.

The present invention is described hereinafter as a sonar pulse echo locator system. Although the principles of operation of the present invention lend themselves more readily to sonar and sonar frequencies, they are not to be thusly limited as they are equally as well applicable to radar or any other form of a pulse echo locator system.

The primary function of a sonar pulse echo locator system, as commonly known, is the detection of remote objects totally submerged in a large body of water. There are a number of physical factors present, however, in a sonar system which have the tendency to render the detection of remote objects extremely difficult and to limit to a great extent the maximum range at which an object may be detected. For the detection of a remote object there must be present in the beam of the sonar transducer some acoustic energy which is due to the presence of the object that is distinguishable from background acoustic energy.

The background contains noise produced by the object itself plus the ambient noise produced by the mass of water. There are also added irregularities that reflect the transmitted energy such as surface and bottom irregularities, marine life, small gas bubbles, thermal structures and many more. This miscellaneous reflection is commonly known to those in the sonar art as reverberation.

Another factor which has a tendency to render the detection of remote objects in water with echo-ranging equipment difficult, is the loss of signal in the two-way transmission path. Energy loss by two-way transmission includes absorption, divergence and bending of sound beams. The absorption loss alone, for instance, is two hundred times greater per mile at sonar frequencies than at radar frequencies propagating into free space. At a sonar frequency of 30 kc. this absorption loss approximates 200 db for a ten mile range. Accordingly, and neglecting all other transmission loss factors, this would require 10,000 volts across the transducer on transmitting to produce a one-microvolt received echo signal from an object ten miles away.

Still another factor present in a sonar pulse echo locator system that has the tendency to render the detection of remote objects extremely difficult under noise-limiting conditions, is that the frequencies commonly used in sonar are usually shifted by an unpredictable amount upon reflection from a detected remote object. This frequency deviation, which in certain instances may attain a deviation as much as two percent, is due to the "Doppler effect," which is a function of the unknown motion of the detected object through the water.

In summary then, there are physical factors present in a sonar pulse echo locator system that offers an extreme amount of background noise, and further there are factors that tend to render the transmitted and received signal extremely weak. The present invention is a new and improved pulse echo locator system designed to greatly increase the signal-to-noise ratio of contemporary locator systems. To accomplish the objective, the present invention employs, in one instance, to its advantage the frequency shift due to Doppler, and in another instance reduces the Doppler shift effect to a negligible amount.

In the system of the present invention an impulse transmitting system is employed operable to simultaneously transmit a pair of pulses each having a different frequency characteristic. The echo signals, deviating in frequency above and below the distinct frequency characteristic of the pair of pulses in dependency on the movement of the object, are heterodyned in a voltage multiplier or mixer with each other to produce a sum frequency signal and a difference frequency signal.

The sum frequency signal also containing the sums of the Doppler shifts is applied to the first of a pair of channels wherein the enhanced Doppler is utilized as hereinafter explained, to indicate the movement of the detected object. The difference frequency signal, which is virtually free of Doppler through subtraction is applied to the second channel wherein it is integrated and filtered for improved signal detection over a noise background.

It is accordingly an object of the present invention to provide a new and improved pulse echo locator system.

A further object of the present invention is to provide in a pulse echo locator system a method and means of distinguishing signals reflected from a detected object over that of background noise.

Another object of the present invention is to provide in a pulse echo locator system method and means of enhancing the Doppler shift of a reflected echo to more readily determine the movement of the detected object.

Another object of the present invention is to provide method and means of minimizing the Doppler shift to a negligible amount to readily distinguish the returning pulse echo from that of background noise.

Another object of the present invention is to provide an aural as well as a visual pulse echo indicator system.

Still another object of the present invention is to provide a new and improved pulse echo locator system wherein simultaneous coherent echo signals reflected from a remote object may be readily distinguishable from randomly occurring signals.

Further objects and attainments of the present invention will become apparent from the following detailed description when taken in conjunction with the single figure shown in block diagram illustrating a typical embodiment of the present invention.

In accordance with the spirit and scope of the teachings of the pulse echo locator system of the present invention, at least a pair of periodic impulses are simultaneously transmitted, each at a different frequency. The returning echo signals, as well as customary noise, is amplified and fed into a mixer or voltage multiplier. In the mixer the pair of different frequency echo signals are heterodyned with each other to produce coherent heterodyne components representing the sum of the two frequencies and the difference between the two input frequencies. The output of the mixer is fed into two distinct channels, the first channel tuned to the sum of the two frequencies and the second channel tuned to the difference frequency of the two echoes.

In the mixer, the addition of the two frequency signals also includes the addition of the Doppler shift of each signal, if the detected object is a moving target. Accordingly the Doppler will be approximately twice as great as if a single frequency signal were employed. This sum frequency signal, including the sum Dopplers, is amplified in the first channel and applied to a utilization circuit, as hereinafter explained, that converts the degree of Doppler shift into information indicative of the relative movement of the detected target. Alternately or in conjunction therewith the sum frequency signal is detected and applied to an aural and visual indicator.

The difference frequency of the two input echoes, as appearing at the output of the mixer, will contain only an extremely small amount of Doppler shift in frequency, especially if the difference in frequency of the two transmitted pulse signals is very small. By the virtual elimination of the Doppler shift there is permitted the use of narrow band filters in the difference-frequency channel to increase detection and identification efficiency of a remote object through signal integration and corresponding noise reduction. The detected signal with most of the noise removed is then converted to a proper audio frequency for aural indication, the signal is also detected and applied to a suitable visual indicator.

Referring now in particular to the figure there is shown a typical embodiment in block form of the present invention incorporated in a sonar signal locator system. Transducer 10 is operative to convert the periodically recurring pulses of electrical energy obtained from the output of keyer and transmitters 11 and 12 into pulses of sound energy and during reception operates to convert sound energy into electrical energy. Transducer 10 is conventional in design and is well known to those in the sonar art. A transducer 10 is shown here, for purposes of illustration only, as to render the system of the present invention applicable to the transmission and reception of energy in water. The system as described, however, may readily adapt itself to the propagation of radio frequency energy into free space. In this case, of course, transducer 10 may be replaced by an antenna of known design.

The coupling unit illustrated at 13 is also of conventional design and isolates the transmitters 11 and 12 electrically from the transducer 10 during reception intervals and protects the receiver from transmitters 11 and 12 during transmission. Keyer and transmitters 11 and 12 are also of known design and are operable to simultaneously transmit a pair of pulse signals, each of the pair having a distinct frequency. As an example, to further illustrate the present invention with respect to sonar, transmitters 11 and 12 each may comprise an oscillator and a simultaneously operative keyer operative to transmit a pair of pulses, say at a carrier frequency of 10.0 kc. and 10.8 kc. respectively. The spacing between pulses is of course dependent upon the range explored to permit the reception of echoes from a transmitted pulse prior to the transmitting of the next pulse. Although, as mentioned, transmitters 11 and 12 are of conventional design a limitation as to design is that they should be linear. Linearity in the transmitters is essential, since non-linearity would produce modulation curves at frequencies other than the desired frequency.

Amplifiers 14 and 15 connected to coupling unit 13 are conventional in design and primarily serve the purpose of raising the level of the incoming echo signals for proper heterodyning in mixer 16. Amplifier 14 as shown in the figure is tuned to the frequency of transmitter 11, whereas amplifier 15 is tuned to the frequency of transmitter 12. As previously mentioned, the reflected echo signals from a moving object will be shifted in frequency from the carrier frequency of the transmitted signal as much as two percent. Amplifiers 14 and 15 then must be sufficiently broadbanded to amplify signals of a frequency at least two percent above and below the particular frequency of the pulse transmitted. It may also be mentioned that in some instances it may not be desirable to employ two distinct amplifiers, this may especially be so where the frequency deviation between the two transmitted signals is small, such as the example given of 10.0 kc. and 10.8 kc. In this instance of course the single amplifier would necessarily have to be sufficiently broadbanded to accommodate both frequencies plus the Doppler shift at each extreme.

The output of amplifiers 14 and 15 is jointly applied to mixer 16. Mixer 16 is conventional in design and in the present system is a conventional square-law mixer operable to heterodyne a pair of signals to produce their sum and difference frequency. Mixer 16 further functions in a manner that utilizes the advantages obtainable from the total signal energy and from the increased coherence of the echo signal energy as compared to the background noise signal energy.

By coherence of signals is meant, for the purposes of this application, that relationship between the instantaneous values of two signals that results in a total energy, when they are linearly combined, that is in excess of the algebraic sum of the signals. This excess energy or the energy difference from that of the algebraic sum is known as the interaction energy.

To illustrate the definition of "coherent signals," if two sinusoidal voltages of substantially the same frequency and of the same amplitude are added linearly in such a way that their peaks and their crossover points occur simultaneously, the resultant energy in a resistive load, to which the resultant voltage may be applied, will be four times the energy which would have resulted from the application of either voltage separately. If on the other hand the voltages are added together in opposite phase and applied to the resistive load, the resultant energy would be zero. Again in a third instance if the two voltages are of substantially different frequencies, the resultant energy would be the algebraic sum of the energy resulting from the application of each of the voltages separately. In the above first two instances the voltages are coherent and the resultant energy is considered to be the algebraic sum of the two voltages plus their interaction energy. In the third instance the signals were incoherent and there is no interaction energy.

Also for purposes of this application the definition of "cross-correlation function" of two signals may be termed as a measure of the degree of coherence existing between the two signals. This cross-correlation function, which may be readily determined from known formulae, is a property which is also easily measured by known instruments.

The increase in energy of the coherent echo signals as compared to incoherent background signal energy is readily seen from considering that the character of the echo signal reflected from a detected object is relatively independent of slight changes in frequency. It has been found however, that the coherence or cross-correlation of random phenomena such as noise becomes small with changes in the frequency band accepted. Acorrdingly the high degree of coherence of echo signals reflected from pulses may readily be separated from undesired back-detected objects resulting from the different transmitted ground noise having a low degree of coherence.

As conventionally known, a moving object causes the received echo pulses to differ in mean frequency from the transmitted pulses, at the rate of 0.7 cycle per kilocycle per knot range rate in ocean water of temperature of 40° F. as known from the Doppler effect. If then, $f_1$ and $f_2$ are the signal frequencies and $\Delta f_1$, and $\Delta f_2$ are the corresponding Doppler shifts the output of mixer 16 may accordingly be represented as:

$$(f_1 + \Delta f_1) + (f_2 + \Delta f_2) = (f_1 + f_2) + (\Delta f_1 + \Delta f_2)$$
$$\text{and } (f_1 + \Delta f_1) - (f_2 + \Delta f_2) = (f_1 - f_2) + (\Delta f_1 - \Delta f_2)$$

If $f_1$ and $f_2$ are chosen to be nearly equal (10.0 and 10.8 respectively) in the difference frequency the difference between Dopplers will be relatively negligible whereas in the sum frequency the Doppler shift will be approximately twice that of either Doppler alone, which follows that, if $f_1 \cong f_2$
then $\Delta f_1 \cong \Delta f_2 = \Delta f$
and $(f_1 + \Delta f_1) + (f_2 + \Delta f_2) = (f_1 + f_2) + 2\Delta f$ whereas in the difference frequency signal the Doppler components are virtually eliminated since $$(f_1 + \Delta f_1) - (f_2 + \Delta f_2) \cong (f_1 - f_2)$$

The signal output of mixer 16 is applied to two distinct receiving channels, a sum frequency channel and a difference frequency channel. In the sum frequency channel the output of mixer 16 is applied to an integrating circuit 20. Integrating circuit 20 functions to separate the sum frequency signal from the difference frequency signal, and may take the form of any one of several conventional circuits, such as a band-pass filter. Integrating circuit 20 must be sufficiently broad banded to accommodate the added Doppler shifts in frequency as well as the sum frequency. The sum frequency pulse echo signal output of integrating circuit 20 is applied to an equally broad-banded amplifier wherein the sum frequency is conventionally amplified.

To present a visual display of the movement of a detected object the output of amplifier 21 is applied to a frequency spectrum analyzer 22, preferably that disclosed in the co-pending application of William J. Finney, Serial No. 171,171, filed June 29, 1950, now U.S. Patent No. 3,121,856. The frequency spectrum analyzer is thoroughly disclosed in the Finney application, however, to complete the present disclosure a brief description may best be given.

The received signals, bearing any of a plurality of frequencies deviating above and below the pre-set transmitted frequency due to the unknown motion of the detected object, are applied simultaneously to a plurality of band-pass filters. Each band-pass filter passes that portion of the received echo signal of the particular frequency to which it is tuned and of a frequency bandwidth in accordance with the signal-to-noise ratio of the spectrum. There is accordingly provided a number of band-pass filters each passing a divisional portion of the received pulse echo energy wherein the signal level exceeds that of the noise. The output of each of the filters is rectified, and integrated in certain instances and applied to an individual contact of a commutating device for sequential delivery to a cathode ray tube indicator.

A cathode ray tube indicator is employed in the system to visually indicate the range, direction, and approximate speed of movement of the detected object. To indicate the range of the detected object the electron beam of the cathode ray tube is swept vertically in synchronism with the emission of an exploratory pulse signal. To indicate the direction of movement of the detected object the electron beam of the cathode ray tube indicator is swept horizontally, so to produce one sweep per each cycle of the commutating device. The output of the commutating device, to which the plurality of filters are applied, is coupled to the intensity grid of the cathode ray tube indicator to produce an intensified spot in a horizontal position on the screen corresponding to the particular filter channel from which the signal originates. Since the frequency shift of the received signal, from the frequency of the transmitted signal, is proportional to the movement of the detected object; there is presented on the cathode ray tube indicator screen the intensified spot or spots in a horizontal position indicative of the direction of movement of the detected object.

An improvement in signal to noise ratio is had in the present invention with the use of the frequency spectrum analyzer 22 over that disclosed in the Finney application since the signal applied thereto in the present instance contains a doubled Doppler shift. Accordingly, recognition and the direction of movement of the detected object is more readily discernible.

In conjunction with the visual display of the movement of the detected object, aural and other indicator means are employed in the sum frequency channel. More precisely, the output of amplifier 21 is also applied to a rectifier 23 and frequency translator 29. The amplified signal is beat with a signal from local oscillator 24 in frequency translator 29 to produce an audio signal for aural detection by means 28 after amplification in amplifier 27. The amplified signal from amplifier 21 is also integrated in integrator 25 to obtain the modulation curve products. The signal from rectifier 23 after integration by integrator 25 is applied to a visual indicator 26 of conventional design, such as a range indicator.

In operation of the difference frequency channel of the two channel reeciving system of the present invention, the heterodyned signals from mixer 16 are applied to an integrating device 30 to pass the difference frequency signal. Integrator 30 is conventional in design and may take any one of several known forms. In actual practice a tuned circuit was employed and was tuned to the difference frequency of the two echo signals. It is to be noted again that in taking the difference frequency the Doppler shift is substantially removed, accordingly this permits the use of very narrow-band circuits throughout the difference frequency channel. Integrator 30, then need not be any broader in bandwidth than to accommodate the extremely small difference Doppler shift of the two signals.

The separated difference frequency pulse echo signal is amplified in narrow band amplifier 31 and beat in frequency translator 32 with a signal from local oscillator 33 to produce an audio signal for aural detection by suitable means 34. It may be mentioned that if the two transmitted signals have a frequency as previously given of 10.0 kc. and 10.8 kc. the difference frequency would be 800 cycles which is a very convenient listening frequency. In that case means 34 can be connected directly to amplifier 31.

The output of amplifier 31 is also applied to a rectifier circuit 35 where the signal is detected then applied to integrator 36. Integrator 36 is also a narrow band filtering system of a long time constant operative to substantially remove all the remaining background noise. The filtered signal is then applied to a computing device 37 such as an auto alarm or other data transfer unit. Also connected to the output of integrator 36 is visual indicator 38 which in this instance may be a long persistance cathode ray tube of known design, to aid in the integration of the detected signal.

In summary the difference frequency channel receiver produces a detected echo signal relatively free of any noise background and in which the transmitted signal envelope is accurately reproduced for comparison data. It is generally known in the sonar art that the signal can be separated from noise background with proper filtering methods. The extreme difficulty is determining where the filters may be placed in terms of frequency, due to the extreme Doppler shift of the signal frequency common to sonar. Because of the signal to noise ratio, a single filtering system to cover the entire band normally would not suffice; however with the Doppler shift in frequency relatively removed, in accordance with the present invention, the frequency to which very narrow band filters may be tuned is known and noise background is readily removed by a single narrow band filter.

Although I have shown certain and specific embodiments of this invention it is to be understood that they are merely illustrative and modifications may, of course, be made therefrom without departing from the true spirit and scope of the invention.

What is claimed is:

1. A pulse echo signal locator system comprising: impulse transmitter means for simultaneously transmitting to remote objects a pair of pulses each having a distinct frequency characteristic, a receiver for receiving said pulses after reflection, heterodyne means in said receiver for mixing the reflected signals of said pair of pulses to produce a sum frequency signal, and means for indicating the presence and extent of the Doppler frequency shift in said sum frequency signal.

2. A pulse echo signal locator system comprising: impulse transmitter means for simultaneously transmitting to remote objects a pair of pulses each having a distinct frequency characteristic, a receiver for receiving said pulses after reflection, heterodyne means in said receiver for mixing the reflected signals of said pair of pulses to produce a sum frequency signal and a difference frequency signal, and means for separating said last named two signals for visually and aurally indicating their presence.

3. A pulse echo signal locator system comprising: an impulse transmitter for simultaneously transmitting to remote objects a pair of pulses each having a distinct frequency characteristic, a receiver for receiving pulse echo signals reflected from said objects, said reflected signals deviating above and below the distinct frequency characteristic of said pair of pulses in dependency on the movement of said remote objects, heterodyne means for discriminating between coherent signals and incoherent background noise and for mixing the reflected signals of said pair of pulses to produce a difference frequency signal and a sum frequency signal, a first separator means connected to said heterodyne means for translating said difference frequency signal, and means connected to said separator means utilizing the difference frequency signal to indicate the presence of echo signals reflected from said remote objects; a second separator means also connected to said heterodyne means for translating said sum frequency signal, and means connected to said last named separator means utilizing the enhanced frequency shift present in said sum frequency signal to indicate the movement of said objects.

4. A pulse echo signal locator system comprising: an impulse transmitter for simultaneously transmitting to remote objects a pair of pulses each having a distinct frequency characteristic, a receiver for receiving pulse echo signals reflected from said objects, said reflected signals deviating in frequency above and below the distinct frequency characteristics of said pair of pulses in dependency on the movement of said objects, heterodyne means in said receiver for mixing the reflected signals of said pair of pulses to produce a sum frequency signal and a difference frequency signal, a first separator means connected to said heterodyne means for translating said sum frequency signal, indicator means responsive to the enhanced frequency shift of sum frequency to indicate the movement of said objects, a second separator means connected to said heterodyne means for translating said difference frequency signal, narrow band filter means connected to said second separator means, and indicator means connected to said filter means to indicate the presence of said remote objects.

5. A pulse echo signal locator system comprising: an impulse transmitter for simultaneously transmitting to remote objects a pair of pulses each having a distinct frequency characteristic, a receiver for receiving pulse echo signals reflected from said objects, said reflected signals deviating above and below the distinct frequency characteristic of said pair of pulses in dependency on the movement of said remote objects, heterodyne means for mixing the reflected signals of said pair of pulses to produce a difference frequency signal and a sum frequency signal, separator means connected to said heterodyne means for translating said difference frequency signal, a narrow band filter connected to said separator means for filtering background noise from said signal, and indicator means coupled to said filter to indicate the presence of echo signals reflected from said remote objects; a second separator means also connected to said heterodyne means for translating said sum frequency signal, and a frequency spectrum analyzer connected to said second separator means operative responsive to the enhanced frequency shift present in said sum frequency signal to indicate the movement of said objects.

6. A pulse echo signal locator system comprising: an impulse transmitter system for simultaneously transmitting a pair of impulses each having a distinct frequency characteristic to remote objects; a receiver for receiving pulse echo signals reflected from said objects, said reflected signals deviating above and below the distinct frequencies characteristic of said pair of pulses in dependency on the movement of said remote objects, heterodyne means in said receiver for mixing the reflected signals of said pair of pulses to produce a difference frequency signal and a sum frequency signal, a first separator means connected to said heterodyne means to translate said difference frequency signal, a narrow band pass filter means connected to said separator means, aural means connected to said filter means to aurally indicate the presence of said remote objects, detection means also connected to said filter means and a visual indicator connected to said detection means to visually indicate the presence of said remote objects; a second separator means connected to said heterodyne means to translate said sum frequency signal, and indicator means responsive to the enhanced frequency shift of said sum frequency signal, to indicate the movement of said objects.

7. A pulse echo signal locator system comprising: an impulse transmitter system for simultaneously transmitting a pair of pulses each having a distinct frequency characteristic to remote objects; a receiver for receiving pulse echo signals reflected from said objects, said reflected signals deviating in frequency above and below the distinct frequency characteristics of said pair of pulses in dependency on the movement of said objects, heterodyne means in said receiver for mixing the reflected signals of said pair of pulses to produce a difference frequency signal and a sum frequency signal, a first integrator means connected to said heterodyne means to separate said difference frequency signal, narrow band filter means connected to said integrator means and indicator means connected to said filter means to indicate the detection of said remote objects, a second integrator means also connected to said heterodyne means to separate said sum frequency signal, a frequency spectrum analyzer connected to said second integrator means responsive to the enhanced frequency shift of said sum frequency signal to visually indicate the movement of said objects, frequency translator means also connected to said second integrator means to convert said sum frequency signal to an audio frequency for aural indication of said signals.

8. A sonar pulse echo signal locator system comprising: an impulse transmitter operable to simultaneously transmit to remote objects a pair of pulses each having a distinct frequency, a transducer operable to convert said pulses to sound energy and operable to convert the signals reflected from said remote objects to electrical signals, said reflected signals deviating above and below the distinct frequency characteristics of said pair of pulses in dependency on the movement of said objects, a receiver for receiving pulse echo signals reflected from said objects, isolating means for coupling said receiver and said transmitter to said transducer, heterodyne means in said receiver for mixing the reflected signals of said pair of pulses to produce a sum frequency signal and a difference frequency signal, means for separating said last named two signals into two channels, filter means in said difference frequency signal channel operative to provide a substantially noise free signal, indicator means coupled to said filter to indicate the presence of said signal; and a frequency spectrum analyzer in said sum frequency channel operative responsive to the enhanced frequency shift of said sum frequency signal to indicate the movement of said objects.

References Cited by the Examiner
UNITED STATES PATENTS

| | | | |
|---|---|---|---|
| 2,193,361 | 3/1940 | Rice | 340—16 X |
| 2,428,821 | 10/1947 | Turner | 340—3 |
| 2,431,854 | 12/1947 | Wood | 340—3 |

CHESTER L. JUSTUS, *Primary Examiner.*

H. MARANS, NORMAN H. EVANS, *Examiners.*

J. R. SPALLA, P. H. BLAUSTEIN, R. A. FARLEY,
*Assistant Examiners.*